(12) United States Patent
Kudrna et al.

(10) Patent No.: US 11,701,532 B2
(45) Date of Patent: Jul. 18, 2023

(54) FIREPROOF ASSEMBLY

(71) Applicant: PRATT & WHITNEY CANADA CORP., Longueuil (CA)

(72) Inventors: Richard Robert Kudrna, Carignan (CA); Benjamin James Renaud, Montreal (CA); Pierre Huppe, Lemoyne (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1173 days.

(21) Appl. No.: 16/269,953

(22) Filed: Feb. 7, 2019

(65) Prior Publication Data
US 2020/0254289 A1   Aug. 13, 2020

(51) Int. Cl.
*A62C 3/08* (2006.01)
(52) U.S. Cl.
CPC ..................... *A62C 3/08* (2013.01)
(58) Field of Classification Search
CPC ........................................... A62C 3/08
USPC .................................................. 169/62
See application file for complete search history.

(56) References Cited

U.S. PATENT DOCUMENTS

| 4,758,028 A | 7/1988 | Davies et al. |
| 5,458,343 A | 10/1995 | Dornfeld et al. |
| 8,844,643 B2 * | 9/2014 | Mickelsen ............... A62C 3/08 428/920 |
| 2014/0174088 A1 | 6/2014 | Ruberte Sanchez et al. |

* cited by examiner

*Primary Examiner* — Christopher S Kim
(74) *Attorney, Agent, or Firm* — Norton Rose Fulbright Canada LLP

(57) ABSTRACT

A fireproof assembly for an aircraft engine, comprises a fireproof housing having an internal volume and an opening. A fireproof internal shield is located within the fireproof housing. The internal shield divides the volume into a first sub-volume and a second sub-volume, the first sub-volume configured for receiving a component of the aircraft engine. A non-fireproof component seals the opening of the fireproof housing. Fireproof fasteners are used to support internal shield inside the housing.

15 Claims, 3 Drawing Sheets

FIREPROOF ASSEMBLY

TECHNICAL FIELD

The application relates generally to gas turbine engines and, more particularly, to fire proof components for such engines.

BACKGROUND OF THE ART

Fireproofing a component of in the context of an aircraft engine can be challenging. Furthermore, fireproof materials are typically expensive and heavy. Improvements are thus desirable.

SUMMARY

In one aspect, there is provided a fireproof assembly for an aircraft engine, comprising: a fireproof housing having an internal volume and an opening; a fireproof internal shield located within the fireproof housing and dividing the volume into a first sub-volume and a second sub-volume, the first sub-volume configured for receiving a component of the aircraft engine; a non-fireproof component sealing the opening of the fireproof housing; and fireproof fasteners supporting the fireproof internal shield in the fireproof housing.

In another aspect, there is provided a fireproof assembly for an aircraft engine, comprising: a fireproof housing enclosing a space receiving a component of the aircraft engine, the housing defining an opening; a first shield in sealing engagement with the housing for closing the opening, the first shield exposed to an environment outside the volume; a second shield located between the first shield and the component, the second shield configured to offer more resistance to fire than the first shield; and the fireproof internal shield secured to the housing via fireproof fasteners.

In yet another aspect, there is provided a method of fireproofing a component of an aircraft engine, comprising: receiving the component of the aircraft engine within a fireproof housing; fluidly isolating the component from an environment outside the fireproof housing by sealing an opening of the fireproof housing with a non-fireproof component; and supporting a fireproof internal shield within the fireproof housing with fireproof fasteners.

DESCRIPTION OF THE DRAWINGS

Reference is now made to the accompanying figures in which.

DETAILED DESCRIPTION

Figure 1:
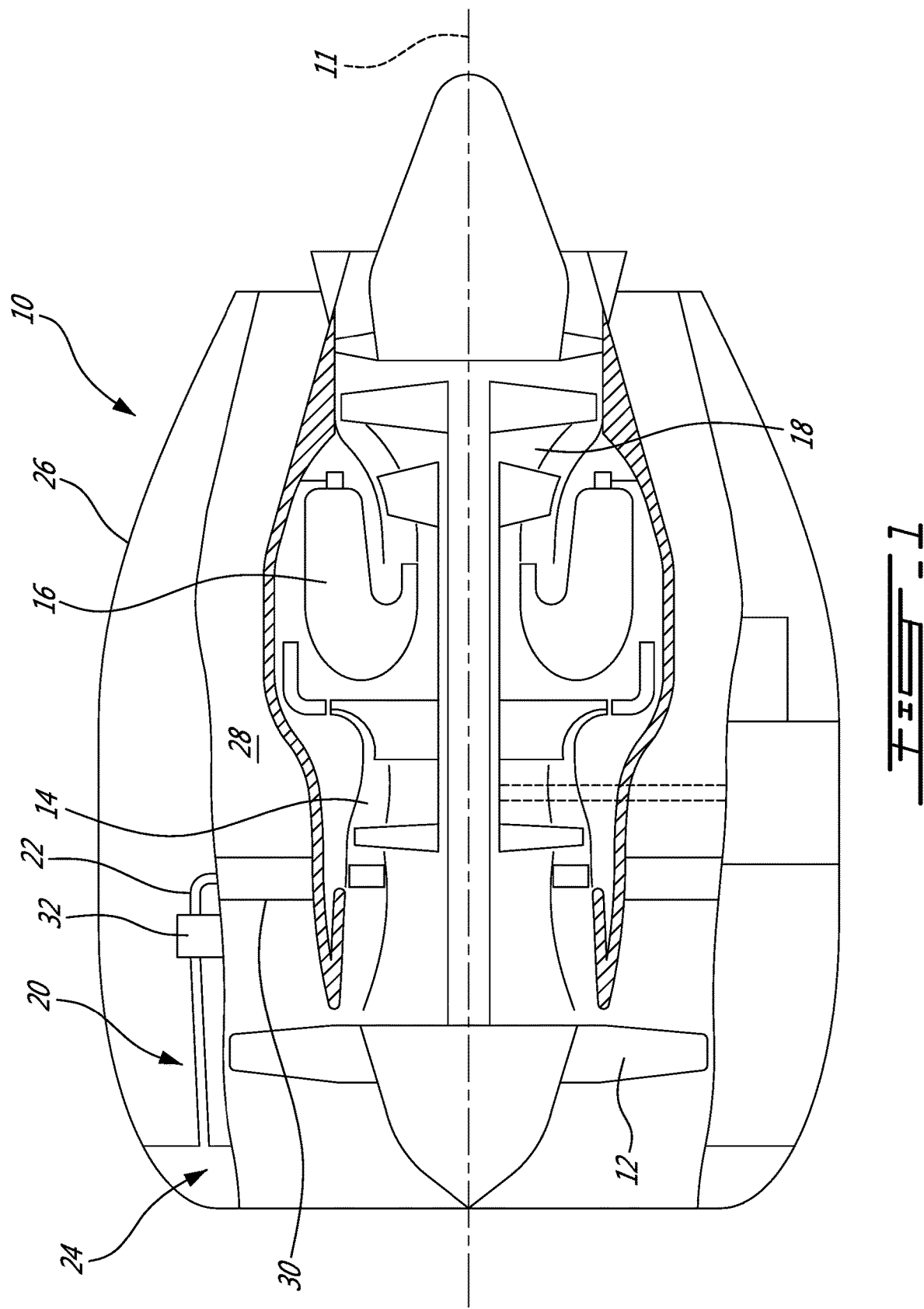
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about an axis 11 of the gas turbine engine 10.

The gas turbine engine 10 includes a pneumatic system, a portion of which is shown at 20. The pneumatic system 20 may use compressed air from the compressor section 14 and distribute this compressed air through a plurality of components in need of air for their operation. In the embodiment shown, the pneumatic system 20 includes conduits 22 that fluidly connect the compressor section 14 to a plenum 24 located at a leading edge of a nacelle 26 of the gas turbine engine 10; the nacelle 26 circumferentially extending around the axis 11 and disposed around the fan 12, the compressor section 14, the combustor 16, and the turbine section 18. The nacelle 26 is radially spaced apart from the compressor section 14, the combustor 16, and the turbine section 18 such as to define a bypass duct 28 therebetween. In the embodiment shown, the plenum 24 is fluidly connected to the compressor section 14 via the conduits 22 and via a passage defined within a strut 30 that extends radially across the bypass duct 28.

The pneumatic system 20 may therefore be used to circulate compressed and heated air from the compressor section 14 in the plenum 24 to prevent ice from forming at the leading edge of the nacelle 26. The compressed and heated air may melt ice that is already formed on the leading edge of the nacelle 26.

It is not always necessary to inject compressed air in the plenum 24. For instance, it might be advantageous to disconnect the plenum 24 from the compressor section 14 such that all the compressed air is used for generating thrust. This might be the case when an aircraft equipped with the gas turbine engine is in a takeoff configuration in which all the available compressed air generated by the compressor section 14 is required for generating thrust. Consequently, an anti-icing valve 32 is used. The anti-icing valve 32 is fluidly connected to both the compressor section 14 and the plenum 24 and is operable in a first configuration in which the compressor section 14 and the plenum 24 are fluidly connected and a second configuration in which the plenum 24 is substantially fluidly disconnected from the compressor section 14.

In some situations, for instance when the anti-icing valve 32 is located in a fire zone of the gas turbine engine 10, it might be required to shield the anti-icing valve 32 against fire. This might be required. Otherwise, if fire were to damage the anti-icing valve 32, compressed air would escape the valve 32 and impair a fire suppression system of the aircraft.

Figure 2:
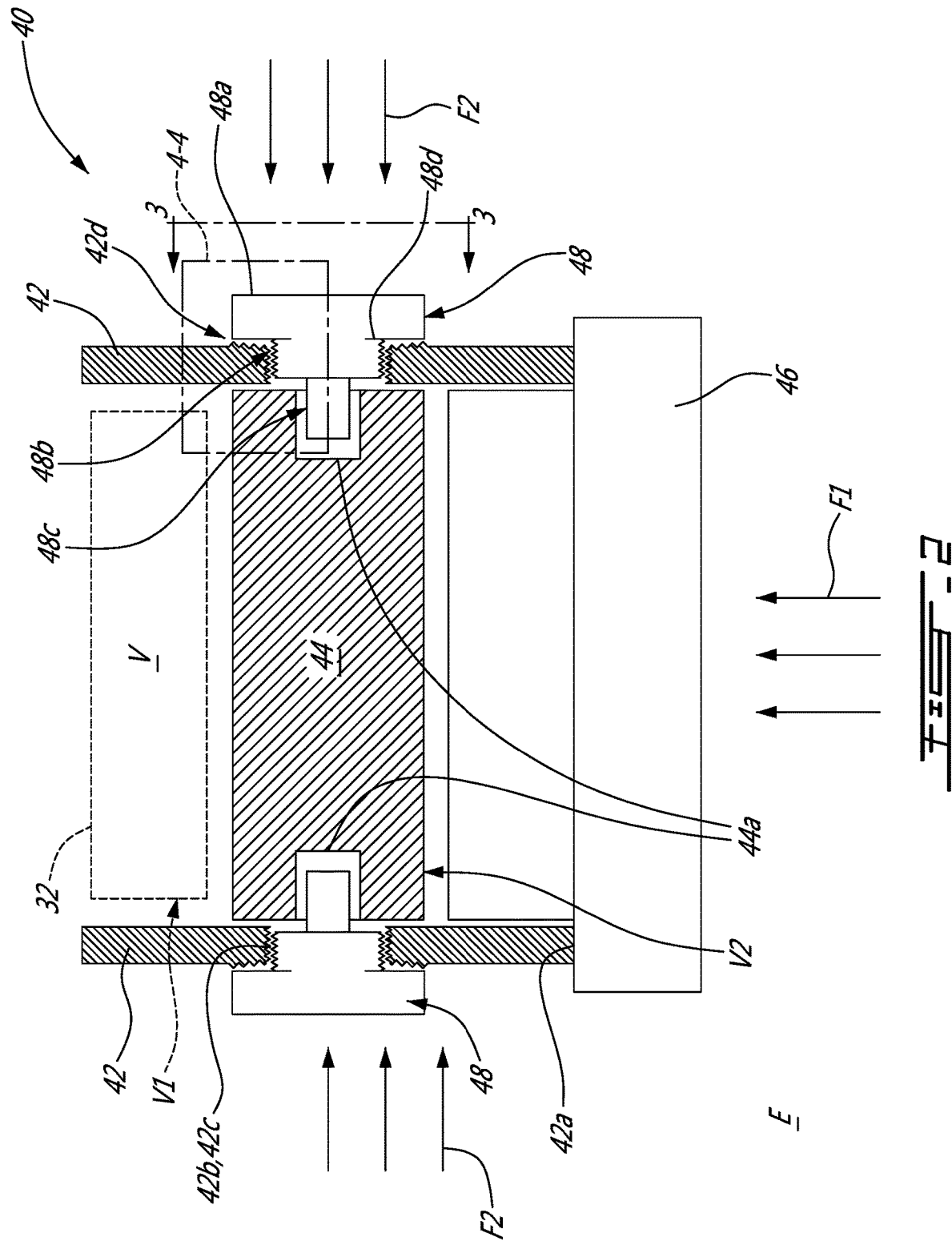
FIG. 2 is a schematic cross-sectional view of a fireproof assembly in accordance with one embodiment.

Referring now to FIG. 2, in the embodiment shown, the anti-icing valve 32 is located within a fireproof assembly 40. The fireproof assembly 40 is used to shield the anti-icing valve 32 against fire. It is understood that although the fireproof assembly 40 is used to shield the anti-icing valve 32, any other component of the gas turbine engine 10 may be shielded with the disclosed fireproof assembly 40. For instance, the component to be shielded against fire may be a component of a fuel system of the gas turbine engine 10. Alternatively, the component to be shielded against fire may be a component of a lubrication system of the gas turbine engine 10.

Herein, an element characterized as fireproof means that this element is able to withstand a flame of 2000° F. for a minimum of 15 minutes. An element characterized as fire resistant means that this element is able to withstand a flame of 2000° F. for a minimum of 5 minutes.

In the depicted embodiment, the assembly 40 includes a fireproof housing 42 that defines an internal volume V and an opening 42a. The assembly 40 includes a fireproof internal shield 44 located within the fireproof housing 42 and dividing the internal volume V into first and second sub-volumes V1, V2. The fireproof internal shield 44 may be another component of the gas turbine engine 10 that is fireproof. In other words, the fireproof internal shield 44 may carry another function further to be a shield for the component 32.

The component to be shielded against fire (e.g., anti-icing valve 32) is received within the first volume V1. A non-fireproof component 46 is in sealing engagement with the fireproof housing 42 such that fluid communication between an environment E outside the internal volume V and the internal volume V via the opening 42a is limited. A metallic seal (not shown) may be disposed between the non-fireproof component 46 and the fireproof housing 42. The non-fireproof component 46 is secured to the fireproof housing 42 using any suitable methods. In a particular embodiment, the non-fireproof component 46 is made of aluminum.

In the embodiment shown, the anti-icing valve 32 is protected by a first shield (the non-fireproof component 46) and by a second shield (the fireproof internal shield 44). The second shield is located between the first shield and the anti-icing valve 32. The second shield is configured to offer more resistance to fire than the first shield.

As the non-fireproof component 46 might be unable to withstand fire, the internal fireproof shield 44 is used to protect the anti-icing valve 32 in an event where fire has deteriorated (e.g., melted) the non-fireproof component 46. In a particular embodiment, having the non-fireproof component 46 being non-fireproof allows for weight and cost savings as a material used for said component 46 might be less heavy and expensive than a fireproof material. Moreover, and still in accordance with a particular embodiment, having the non-fireproof component 46 made of a non-fireproof material allows the component 32 protected by the fireproof assembly 40 to be operated within temperature limits by expelling heat that it generates to the environment E.

Still referring to FIG. 2, the internal fireproof shield 44 is held within the internal volume V by fireproof fasteners 48, two in the embodiment shown. In other words, the fireproof internal shield 44 is secured to the fireproof housing 42 via the fireproof fasteners 48. In the embodiment shown, each the fireproof fasteners 48 includes a head 48a, a threaded portion 48b, and a dowel portion 48c. More or less than two fireproof fasteners may be used. In a particular embodiment, only one fireproof fastener is used.

In the depicted embodiment, the threaded portions 48b are in threading engagement with corresponding threads 42b of apertures 42c defined through the fireproof housing 42. A sealing engagement may be defined between the threaded portions 48b and the threaded apertures 42c. The threaded portions 48b may be fine threads to provide for a better sealing engagement than if regular or coarse threads were use.

The dowel portions 48c are used for engaging the internal fireproof shield 44. More specifically, and in the embodiment shown, the dowel portions 48c are in engagement with recesses 44a defined by the internal fireproof shield 44. The dowel portions 48c may be slidingly received within the recesses 44a.

In the embodiment shown, the heads 48a have a diameter greater than that of the threaded portions 48b thereby defining shoulders 48d. The shoulders 48d are in abutment against an external side 42d of the fireproof housing 42 that faces away from the internal volume V. A sealing engagement may be defined between the shoulders 48d and the fireproof housing 42.

Figure 4:
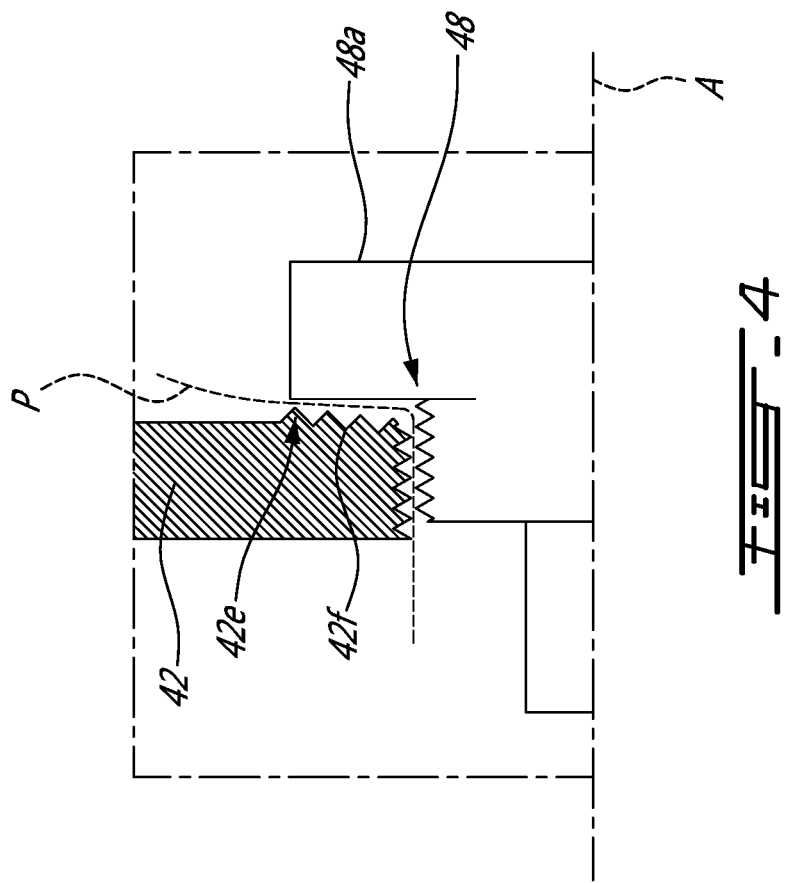
FIG. 4 is an enlarged view of zone 4-4 of FIG. 2.
Figure 3:
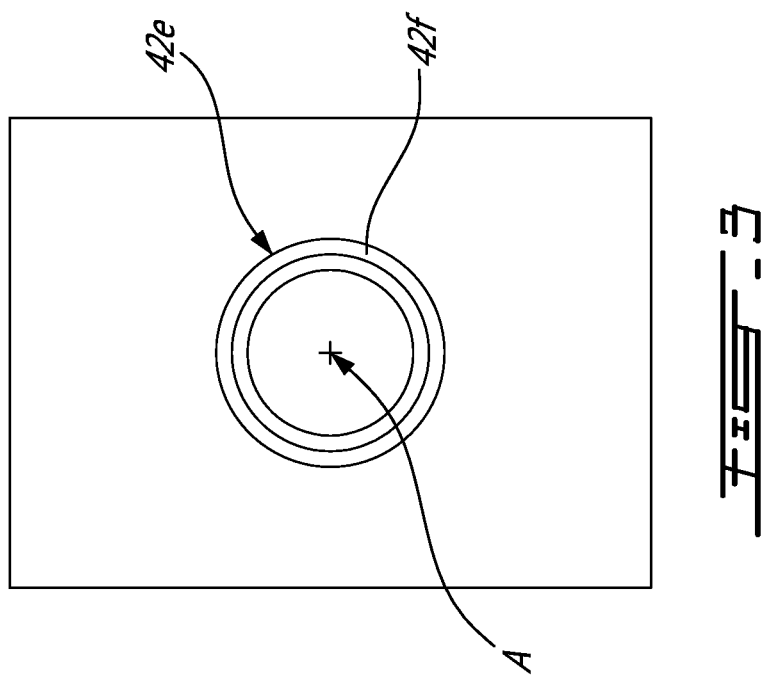
FIG. 3 is a schematic front view taken along line 3-3 of FIG. 2.

Referring now to FIGS. 2-4, the fireproof housing 42 defines a plurality of crests 42e and valleys 42f circumferentially extending around axes A of the apertures 42c. The crests and valleys 42e, 42f are radially separated from one another relative to the axes A. Tortuous gas paths P are defined between the shoulders 48d and the crests and valleys 42, 42f defined by the fireproof housing 42. The tortuous gas paths P might be able to offer more resistance to air than if the crests and valleys were not present. In other words, the tortuous gas paths P might allow for a better sealing engagement between the shoulders 48d of the fasteners 48 and the fireproof housing 42 than if the crests and valleys were absent. Alternatively, the crests and valleys may be defined by the heads 48a of the fireproof fasteners 48.

Therefore, and in accordance with the embodiment shown, the fastener's threaded portions 48b and the tortuous gas paths P act as two seals disposed in serial. That might be advantageous for applications that require superior sealing against external leakage in normal operation.

In the event of a fire, the non-fireproof component 46 might melt or become compromised. The disclosed fireproof assembly 40 might act to limit an effective area of the breach from the outside to the inside of the component (e.g., anti-icing valve 32) such that the fire might not reach the component. This might limit leakage of flammable fluids (e.g. fuel), or other fluid (e.g., air, lubricant, etc), out of the component, which could compromise the effectiveness of the fire suppression system, or result in failure to meet the fire safety certification requirements.

The disclosed fireproof assembly 40 might provide an alternative mean to meet fire safety requirements for applications where costs and/or weight of having all component external housings, and/or external features, be fabricated with the use of fire-proof materials would be to prohibitive. Additionally, the component enclosed within the fireproof assembly 40 might be optimized to reject heat to the environment E if necessary, to maintain its internal components within design temperature limits.

If a fire comes from direction F1, the non-fireproof component 46 may melt and the component 32 might remain protected from the fire by the fireproof internal shield 44. If the fire comes from direction F2, the component 32 might be protected from the fire by the fireproof housing 42 and the fireproof fasteners 48. The sealing engagement between the fireproof fasteners 48 and the fireproof housing 42 might prevent the fire from penetrating inside the fireproof housing 42.

For fireproofing the component 32, the component is received within the fireproof housing 42. The component 32 is fluidly isolated from the environment E outside the fireproof housing by sealing the opening 42a of the fireproof housing 42 with the non-fireproof component 46. The fireproof internal shield 44 located inside the fireproof housing is supported with fireproof fasteners 48.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A fireproof assembly for an aircraft engine, comprising:
   a fireproof housing enclosing a space receiving an anti-icing valve of the aircraft engine, the housing defining an opening for inserting the anti-icing valve;
   a first shield in sealing engagement with the housing for closing the opening and enclosing the anti-icing valve within the space, the first shield exposed to an environment outside the space; and
   a second shield located between the first shield and the anti-icing valve, the second shield more fire resistant than the first shield, the second shield secured to the housing via fireproof fasteners.

2. The fireproof assembly of claim 1, wherein the fireproof housing defines apertures, a fastener of the fireproof fasteners extending through and being in sealing engagement with a corresponding aperture of the apertures.

3. The fireproof assembly of claim 1, wherein the second shield defines recesses, the recesses engaged by the fireproof fasteners.

4. The fireproof assembly of claim 1, wherein the second shield is a fireproof component of the aircraft engine.

5. The fireproof assembly of claim 1, wherein the fireproof fasteners include threaded portions in threading engagement with correspondingly threaded apertures defined in the fireproof housing, a sealing engagement defined between the threaded portions and the threaded apertures.

6. The fireproof assembly of claim 5, wherein the fireproof fasteners include heads having a diameter greater than that of the threaded portions, the heads defining shoulders in abutment against an external side of the fireproof housing facing away from the internal volume, the shoulders sealingly engaging the external side of the fireproof housing.

7. The fireproof assembly of claim 1, wherein the fireproof fasteners include dowel portions protruding from threaded portions, the threaded portions threadingly engaged to correspondingly threaded apertures defined through the fireproof housing, the dowel portions in engagement with the second shield.

8. The fireproof assembly of claim 1, wherein the fireproof fasteners have heads having a diameter greater than that of a remainder of the fireproof fasteners, the heads in abutment with an external side of the fireproof housing, the heads in sealing engagement with the external side of the fireproof housing.

9. The fireproof assembly of claim 8, wherein crests and valleys are defined by the external side of the fireproof housing, tortuous gas paths defined between the crests and valleys and the heads of the fireproof fasteners.

10. A fireproof assembly for an aircraft engine, comprising:
    a fireproof housing enclosing a space receiving a component of the aircraft engine, the housing defining an opening for inserting the component;
    a first shield in sealing engagement with the housing for closing the opening and enclosing the component within the space, the first shield exposed to an environment outside the space; and
    a second shield located between the first shield and the component, the second shield more fire resistant than the first shield, the second shield secured to the housing via fireproof fasteners;
    wherein the fireproof fasteners have heads having a diameter greater than that of a remainder of the fireproof fasteners, the heads in abutment with an external side of the fireproof housing, the heads in sealing engagement with the external side of the fireproof housing.

11. The fireproof assembly of claim 10, wherein the fireproof fasteners include threaded portions in threading engagement with correspondingly threaded apertures defined in the fireproof housing.

12. The fireproof assembly of claim 11, wherein the heads of the fireproof fasteners have a diameter greater than that of the threaded portions, the heads defining shoulders in abutment against the external side of the fireproof housing facing away from the internal volume, the shoulders sealingly engaging the external side of the fireproof housing.

13. The fireproof assembly of claim 10, wherein the component is an anti-icing valve.

14. A fireproof assembly for an aircraft engine, comprising:
    a fireproof housing enclosing a space receiving a component of the aircraft engine, the housing defining an opening for inserting the component;
    a first shield in sealing engagement with the housing for closing the opening and enclosing the component within the space, the first shield exposed to an environment outside the space; and
    a second shield located between the first shield and the component, the second shield more fire resistant than the first shield, the second shield secured to the housing via fireproof fasteners;
    wherein the fireproof fasteners include threaded portions in threading engagement with correspondingly threaded apertures defined in the fireproof housing, a sealing engagement defined between the threaded portions and the threaded apertures.

15. A fireproof assembly for an aircraft engine, comprising:
    a fireproof housing enclosing a space receiving a component of the aircraft engine, the housing defining an opening for inserting the component;
    a first shield in sealing engagement with the housing for closing the opening and enclosing the component within the space, the first shield exposed to an environment outside the space; and
    a second shield located between the first shield and the component, the second shield more fire resistant than the first shield, the second shield secured to the housing via fireproof fasteners;
    wherein the fireproof fasteners include dowel portions protruding from threaded portions, the threaded portions threadingly engaged to correspondingly threaded apertures defined through the fireproof housing, the dowel portions in engagement with the second shield.

* * * * *